United States Patent [19]

Kato et al.

[11] Patent Number: 4,757,231
[45] Date of Patent: Jul. 12, 1988

[54] BEAM-INDEX TYPE COLOR CATHODE RAY TUBE DEVICE

[75] Inventors: Hiroshi Kato, Kanagawa; Reiko Saito, Saitama, both of Japan

[73] Assignee: Sony Corporation, Tokyo, Japan

[21] Appl. No.: 906,731

[22] Filed: Sep. 12, 1986

[30] Foreign Application Priority Data

Sep. 12, 1985 [JP] Japan .................. 60-202149
Sep. 28, 1985 [JP] Japan .................. 60-215795
Oct. 21, 1985 [JP] Japan .................. 60-234968

[51] Int. Cl.$^4$ .................. H01J 29/34; H01J 29/86
[52] U.S. Cl. .................. 313/466; 313/461; 313/471
[58] Field of Search .............. 313/422, 471, 466, 461, 313/477 R

[56] References Cited

U.S. PATENT DOCUMENTS

| | | | |
|---|---|---|---|
| 2,842,697 | 7/1958 | Bingley | 313/471 |
| 3,005,125 | 10/1961 | Evans et al. | 313/471 |
| 3,767,954 | 10/1973 | van den Avoort | 313/471 |
| 4,122,213 | 10/1978 | Ito et al. | 427/68 X |
| 4,209,551 | 6/1980 | Masaki et al. | 427/68 |
| 4,406,974 | 9/1983 | Tanaka et al. | 313/471 X |
| 4,590,092 | 5/1986 | Giancaterini et al. | 427/68 |
| 4,654,559 | 3/1987 | Hinotani et al. | 313/422 |

FOREIGN PATENT DOCUMENTS 0042145 3/1983 Japan .................. 313/422

Primary Examiner—David K. Moore
Assistant Examiner—Michael Horabik
Attorney, Agent, or Firm—Hill, Van Santen, Steadman & Simpson

[57] ABSTRACT

A beam-index type color cathode ray tube device which includes a front panel portion, a screen panel portion which faces the front panel portion, a phosphor screen including a plurality of index phosphor stripes fixed to the inner surface of the screen panel portion and extending at regularly spaced intervals. A porous inorganic layer is fixed on the inner surface of the screen panel portion and extends between each adjoining pair of the index phosphor stripes. A metallic reflecting layer covers the index phosphor stripes and the porous inorganic layer. A plurality of color phosphor stripes is applied to the metallic reflecting layer in a predetermined pattern. A photodetecting portion disposed at the outside of the screen panel portion receives fluorescence from the actuation of the index phosphor stripes.

12 Claims, 5 Drawing Sheets

BEAM-INDEX TYPE COLOR CATHODE RAY TUBE DEVICE

BACKGROUND OF THE INVENTION

1. Field of the Invention

The present invention relates to beam-index type cathode ray tube devices wherein a phosphor screen is provided with a plurality of color phosphor stripes accompanied by index phosphor stripes on the inner surface of a screen panel portion which faces a front panel portion. Fluorescence from the index phosphor stripes is detected at the outside of the screen panel portion.

2. Description of the Prior Art

The prior art includes disclosures of the so-called reflex color cathode ray tube of the beam-index type as one type of color cathode ray tube device which can be adapted generally to form color television receivers of relatively small size. A reflex color cathode ray tube of the beam-index type has a front panel portion which allows colored light to pass therethrough and a screen panel portion which faces the front panel portion and is provided on its inner surface with a phosphor screen including a plurality of color phosphor stripes of the three primary colors and a plurality of index phosphor stripes. Color images displayed on the phosphor screen are observed through the front panel portion and fluorescence from each of the index phosphor stripes referred to a index fluorescence is received by a photosensitive portion provided at the outside of the screen portion panel with relation to the phosphor screen.

FIG. 1 shows a portion of a previously proposed reflex color cathode ray tube of the prior art. In this device, a phosphor screen is provided on the inner surface of a screen panel portion 13 which is positioned to face a front panel portion 11. The phosphor screen is formed with a plurality of index phosphor stripes 15 which are secured on the inner surface of the screen panel portion 13 and extend parallel to one another at regularly spaced intervals for emitting ultraviolet rays as index fluorescence in response to impingement of an electron beam thereon. A plurality of carbon stripes 17 is each affixed to the inner surface of the screen panel portion 13 and extend between each adjoining pair of index phosphor stripes 15, i.e., there are two phosphor stripes between two adjoining carbon stripes. A plurality of color phosphor stripes of the three primary colors including red phosphor stripes 19R which produce red fluorescence upon excitation by an electron beam, blue phosphor stripes 19B which produce blue fluorescence by excitation of the electron beam, and green phosphor stripes 19G which produce green fluorescence in response to excitation by the electron beam. These phosphor stripes are fixed on the carbon stripes 17 and extend parallel to each other alongside the index phosphor stripes 15 at regularly spaced intervals.

The tube also includes a luminescence receiving plate member 21 which faces the outer surface of the screen panel portion 13 for receiving the index fluorescence emitted by each of the index phosphor stripes 15. This luminescence-receiving plate member 21 is operative to emit secondary index fluorescence which may be detected by an index fluorescence detector such as a photodiode in response to the index fluorescence emitted from the index phosphor stripes 15 and direct the same to an index fluorescence detector. Accordingly, the index fluorescence emitted from each of the index phosphor stripes 15 is converted in wavelength by the luminescence receiving plate member 21 so that it may be detected by the index fluorescence detector. The luminescence receiving plate member 21 may be formed of an acrylic resin in which a specific phosphor, selected for its ability to absorb the index fluorescence from the index phosphor stripe 15 and emit the secondary index fluorescence, is dispersed.

In such a beam-index type color cathode ray tube, when the phosphor screen on the inner surface of the screen panel portion 13 is scanned by an electron beam emitted by an electron gun assembly, color images are displayed on the phosphor screen with the red, blue and green fluorescences emitted by the red, blue and green phosphor stripes 19R, 19B and 19G, respectively, and are observed through the front panel portion 11. At the same time, the index fluorescence emitted from each of the index phosphor stripes 15 impinges on the luminescence receiving plate member 21 through the screen panel portion 13 and the secondary index fluorescence produced in response to the fluorescence from the index phosphor stripe 15 is directed to the index fluorescence detector from the luminescence receiving plate member 21. An index signal used for modulating the phosphor screen with a color video signal is thus supplied to the electron gun assembly in response to momentary scanning positions of the electron beam on the phosphor screen.

In the previously described reflex color cathode ray tube of the beam-index type as described above, portions of the red, blue and green fluorescences emitted from the red, blue and green phosphor stripes 19R, 19B and 19G toward the screen panel portion 13 are extinguished by the carbon stripes 17 to prevent them from entering into the luminescence receiving plate member 21 through the screen panel portion 13 and thus causing the luminescence receiving plate member 21 to produce spurious secondary index fluorescence. Moreover, the index fluorescence emitted from the index phosphor stripe 15 is directed not only toward the screen panel portion 13 but also toward the front panel portion 11 and a portion of the index fluorescence emitted from the index phosphor stripe 15 toward the front panel portion 11 does not arrive at the luminescence receiving plate member 21 and therefore does not contribute to the production of the secondary index fluorescence which is detected by the index fluorescence detector. This means that the index fluorescence emitted from the index phosphor stripe 15 is reduced almost by half in the production of secondary index fluorescence. Accordingly, it is possible that the index fluorescence entering into the luminescence receiving plate member 21 from the index phosphor stripe 15 becomes insufficient in intensity to cause the luminescence receiving plate member 21 to produce the required secondary index fluorescence, and as a result, the secondary index fluorescence detected by the index fluorescence detector is insufficient in intensity. Consequently, an index signal with a superior signal-to-noise ratio cannot be obtained from the index fluorescence detector.

Furthermore, the part of the index fluorescence emitted from the index phosphor stripes 15 toward the front panel portion 11 is within the sight of observers together with the red, blue and green fluorescences emitted from the red, blue and green phosphor stripes 19R, 19B and 19G toward the front panel portion 11. This results in the disadvantage that the color purity of each of the red, blue and green fluorescences observed by the observers is deteriorated due to visible rays contained in the index fluorescence emitted from the index phosphor stripes 15. Particularly in the case where the electron beam for exciting each of the index phosphor stripes 15 is increased in density for the purpose of increasing the intensity of the index fluorescence entering into the luminescence receiving plate member 21, the portion of the index fluorescence emitted from the index phosphor stripe 15 toward the front panel portion 11 to be in the sight of observers together with the red, blue and green fluorescences is also increased in intensity. Accordingly, the deterioration in color purity of each of the red, blue and green fluorescences emitted from the phosphor stripes is objectionable. In addition, in this case, since the dark electron beam current in the cathode ray tube is increased, the black level of the color image on the phosphor screen is increased so as to deteriorate the quality of the color image.

For the purpose of avoiding the above-mentioned problems or disadvantages inherent in the reflex color cathode ray tube of the prior art, it has been suggested that such a reflex color cathode ray tube as shown in FIG. 1 be provided with a metallic reflecting layer to cover each of the index phosphor stripes fixed on the inner surface of the screen panel portion and each of the partial areas of the inner surface of the screen panel portion at which the index phosphor stripes are not attached. Then, a plurality of color phosphor stripes of the three primary colors is provided on the metallic reflecting layer so as to form a phosphor screen. In a reflex color cathode ray tube of this type which is provided with a metallic reflecting layer, the index fluorescence from each of the index phosphor stripes is reflected at the surface of the metallic reflecting layer on the side of the screen panel portion and is efficiently introduced into a luminescence receiving plate member disposed in facing relation to the outer surface of the screen panel portion without being directed toward the front panel portion. The red, blue and green fluorescences emitted from the color phosphor stripes are then reflected at the surface of the metallic reflecting layer on the side of the front panel portion and are directed efficiently toward the front panel portion. Consequently, the index fluorescence entering into the luminescence receiving plate member from each of the index phosphor stripes becomes sufficient in intensity to cause the luminescence receiving plate member to produce adequate secondary index fluorescence, and each of the red, blue and green fluorescences emitted from the color phosphor stripes is prevented from being deteriorated in color purity to the observer. The luminous efficiency of each of the color phosphor stripes is thus substantially improved.

However, in the case of the metallic reflecting layer being provided over the inner surface of the screen panel portion to cover the index phosphor stripes, there is a new problem presented as follows.

The metallic reflecting layer covering the index phosphor stripes is usually formed by means of vacuum evaporation on an intermediate thin layer of resin which is provided over the inner surface of the screen panel to cover the index phosphor stripes in order to fill up minute spaces among phosphor particles or the like at the surface of each of the index phosphor stripes and thereby form a smooth plane on each of the index phosphor stripes. Then, an intermediate thin layer of a resin is evaporated and dispelled in a heating process wherein the screen panel portion on which the phosphor screen has been formed is subject to thermal treatment.

When the intermediate thin layer of resin is evaporated and dispelled, the vapor resulting from the evaporation of the intermediate thin layer of plastic resin provided on each of the partial areas of the inner surface of the screen panel portion at which the index phosphor stripes are not fixed is prevented from escape by the metallic reflecting layer and as a result causes the metallic reflecting layer protruding from the inner surface of the screen panel portion to have blisters. The metallic reflecting layer provided with the blisters therein constitutes a defect in that a smooth surface of the metallic reflecting layer cannot be obtained and a further disadvantage that breaches or exfoliations of themetallic reflecting layer are likely to be caused at the blisters.

SUMMARY OF THE INVENTION

The present invention provides a beam-index type color cathode ray tube which avoids the foregoing problems and disadvantages encountered in the prior art.

The present invention provides a beam-index type color cathode ray tube device which has a phosphor screen including a plurality of color phosphor stripes accompanied with index phosphor stripes on the inner surface of a screen panel portion facing a front panel portion so that color images displayed on the phosphor screen are observed through the front panel portion and fluorescence from each of the index phosphor stripes is received by a photosensitive portion provided at the outside of the screen panel. The fluorescence from each of the index phosphor stripes is directed efficiently into the photosensitive portions, and color fluorescence emitted from each of the color phosphor stripes is prevented from being deteriorated in color purity so that luminous efficiency of each of the color phosphor stripes is substantially improved.

The present invention provides a beam-index type color cathode ray tube device which has a phosphor screen including a plurality of color phosphor stripes interspersed with index phosphor stripes on the inner surface of a screen panel portion facing a front panel portion so that color images displayed on the phosphor screen are observed through the front panel portion and fluorescence from each of the index phosphor stripes is received by a photosensitive portion provided at the outside of the screen panel. The phosphor screen is also provided with a metallic reflecting layer which has a smooth surface and provides a partition plane between the color phosphor stripes and the index phosphor stripes.

The beam-index type color cathode ray tube of the present invention has a phosphor screen which includes a plurality of color phosphor stripes accompanied by index phosphor stripes on the inner surface of a screen panel portion which faces a front panel portion so that color images displayed on the phosphor screen are observed through the front panel portion and fluorescence from each of the index phosphor stripes is received by a photosensitive portion provided at the outside of the screen panel. The index phosphor stripes are fixed on the inner surface of the screen panel portion and the phosphor screen is provided with a porous inorganic layer which is affixed to the inner surface of the screen panel to extend between an adjoining pair of the index phosphor stripes. A metallic reflecting layer covering the index phosphor stripes and the porous inorganic layer provides a partition plane between the color phosphor stripes and the index phosphor stripes.

The beam-index type color cathode ray tube of the present invention comprises a front panel portion which permits colored light to pass therethrough, a screen panel portion disposed in facing relation to the front panel portion, a phosphor screen comprising a plurality of index phosphor stripes fixed to the inner surface of the screen panel portion and extending at regularly spaced intervals, a porous inorganic layer fixed on the inner surface of the screen panel portion and extending between each adjoining pair of the index phosphor stripes, a metallic reflecting layer covering the index phosphor stripes and the porous inorganic layer, and a plurality of color phosphor stripes fixed to the metallic reflecting layer in a predetermined arrangement, together with a photodetecting portion disposed at the outside of the screen panel portion for receiving fluorescence emitted from each of the index phosphor stripes.

In the process of producing the beam-index type color cathode ray tube of the present invention, the metallic reflecting layer covering the index phosphor stripes and the porous inorganic layer are formed, for example, by means of vacuum evaporation on an intermediate thin layer of a plastic resin which is provided to coat the surfaces of each of the index phosphor stripes and the porous inorganic layer. The intermediate thin layer of plastic is evaporated and dispelled from the phosphor screen in a heating process wherein the screen panel portion on which the phosphor screen has been formed is subjected to thermal treatment.

When the intermediate thin layer of plastic is evaporated and dispelled, the vapor resulting from the evaporation of the intermediate thin layer of plastic is transpired through the index phosphor stripes and the porous inorganic layer to the outside of the phosphor screen. Consequently, the vapor resulting from the evaporation of the intermediate thin layer of plastic is not prevented from escape and therefore the metallic reflecting layer is prevented from forming blisters. As a result, the metallic reflecting layer provided in the screen according to the present invention has a smooth surface without any accompanying blisters.

In the device produced according to the present invention, the fluorescence emitted from each of the index phosphor stripes toward the front panel portion is reflected at the metallic reflecting layer to the screen panel portion and colored fluorescence emitted from each of the color phosphor stripes toward the screen panel portion is reflected at the metallic reflecting layer to the front panel portion. The result is that the fluorescence emitted from each of the index phosphor stripes toward the screen panel portion and the fluorescence emitted from each of the index phosphor stripes toward the front panel portion and reflected at the metallic reflecting layer enter into the photodetecting portion through the screen panel portion. The fluorescence from each of the index phosphor stripes enters efficiently into the photodetecting portion. Since the colored fluorescence emitted from each of the color phosphor stripes toward the front panel portion and the colored fluorescence emitted from each of the color phosphor stripes toward the screen panel portion and reflected at the metallic reflecting layer are efficiently directed to pass through the front panel portion and the fluorescence emitted from each of the index phosphor stripes and directed to the front panel portion after passing through the metallic reflecting layer is weak enough, the luminous efficiency of each of the color phosphor stripes is substantially improved and the colored fluorescence emitted from each of the color phosphor stripes and observed through the front panel is not deteriorated in color purity due to the fluorescence from each of the index phosphor stripes.

In one embodiment of a device according to the present invention, the porous inorganic layer contains a pigment dispersed therein so as to provide a predetermined color. In the production of a phosphor screen utilizing such a porous inorganic layer with a pigment dispersed therein, when a slurry of color phosphor is applied to the metal reflecting layer, and exposed to light from a light source through a photomask for forming the color phosphor stripes on the metallic reflecting layer, the condition of exposure of the slurry to the light is observed from the outside of the screen panel portion.

In this arrangement, the light from the light source passes through the slurry and the index phosphor stripes with relatively small attenuation but is considerably attenuated at the porous inorganic layer because the pigment dispersed in the porous inorganic layer absorbs the light efficiently. The light from the light source passes through the photomask which is positioned properly for determining the positions of the color phosphor stripes to reach the porous inorganic layer. Consequently, the photomask can be located correctly to determine the positions of the color phosphor stripes, with a shift of the photomask to cause the light observed through the screen panel to have minimum luminosity. As a result, the color phosphor stripes can be easily positioned properly in relation to the index phosphor stripes through observation of the light for the exposure of the slurry passing through the screen panel portion and by positional adjustment of the photomask in accordance with the observation of the light in the process of forming the color phosphor stripes on the metallic reflecting layer. Therefore, efficiency of production of the phosphor screen is improved.

In another embodiment, the metallic reflecting layer is produced through a process of surface treatment with an oxidizing agent. Unnecessary color phosphor for forming the color phosphor stripes can easily be eliminated from the surface of the metallic reflecting layer so that color phosphor stripes are provided with superior quality without passing through a process designed specifically for increasing elimination of the unnecessary color phosphor.

The above objects, features and advantages of the invention, as well as additional details, will become apparent from the following description taken in conjunction with the accompanying drawings.

DESCRIPTION OF THE PREFERRED EMBODIMENTS

Figure 1:
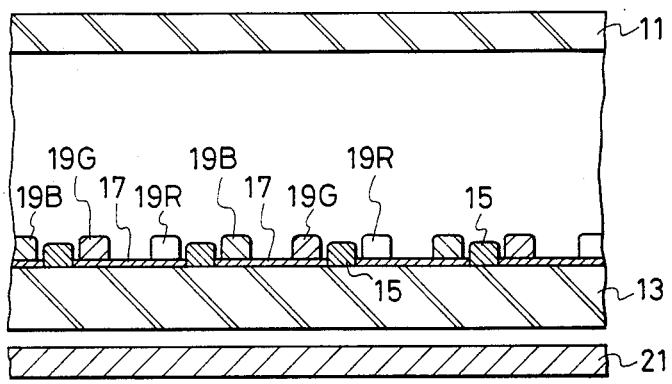
FIG. 1 is a cross-sectional view illustrating a part of a reflex color cathode ray tube device of the beam-index type from the prior art.
Figure 2:
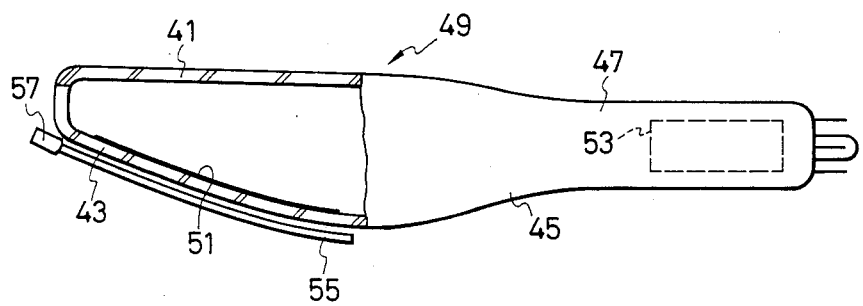
FIG. 2 is a side elevational view, partly in cross section, showing one embodiment of a beam-index type color cathode ray tube according to the present invention.
Figure 3:
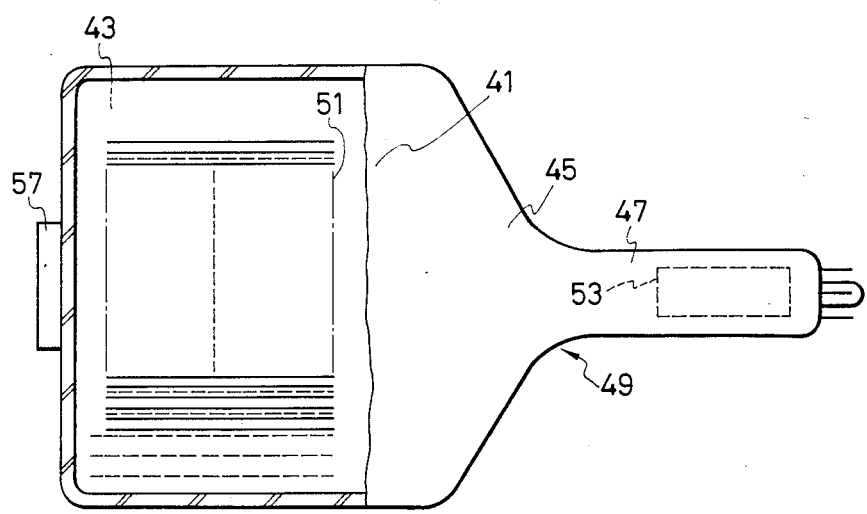
FIG. 3 is a plan view, partially broken away, of the embodiment shown in FIG. 2.

FIGS. 2 and 3 show an example of the beam-index type color cathode ray tube according to the present invention. There is shown a reflex type device having a flat glass envelope 49 which includes a front panel portion 41, a screen panel portion 43 facing the front panel portion 41, and a neck portion 47 connected through a conical funnel portion 45 to both the front panel portion 41 and the screen panel portion 43. The front panel portion 41 is rectangular in shape and permits colored light to pass therethrough. The screen panel portion 43 is also shaped rectangularly and is curved slightly, and is provided on its inner surface with a phosphor screen 51 of rectangular configuration along the screen panel portion 43. The phosphor screen 51 includes a plurality of color phosphor stripes of three primary colors and a plurality of index phosphor stripes. In the neck portion 47, an electron gun assembly 53 is provided to produce an electron beam impinging on the phosphor screen 51 from the side of the front panel portion 41 to scan the same. Since the phosphor screen 51 is curved along the screen panel portion 43, the incident angle of the electron beam is prevented from having large variations at different locations over the phosphor screen 51.

At the outside of the screen panel portion 43 there is a luminescence receiving plate member 55 which faces and extends along the outer surface of the screen panel portion 43. An index fluorescence detector 57 containing a photosensitive device such as a photodioxide is attached to one end of the luminescence receiving plate member 55. The luminescence receiving plate member 55 receives luminescence emitted from each of the index phosphor stripes through the screen panel portion 43 and is operative to produce secondary index fluorescence which may be detected by the photosensitive device contained in the index fluorescence detector 57 in response to the index fluorescence emitted from the index phosphor stripes. This luminescence receiving plate member 55 may be formed, for example, of an acrylic resin in which specific phosphors selected for their ability to absorb index fluorescence from the index phosphor stripes and emitting secondary index fluorescence are dispersed.

The index fluorescence detector 57 produces an index signal in response to the secondary index fluorescence received and causes the electron beam generated by the electron gun assembly 53 to be modulated with a color video signal supplied to the electron gun assembly 53 in response to momentary scanning positions of the electron beam on the phosphor screen 51.

Figure 4:
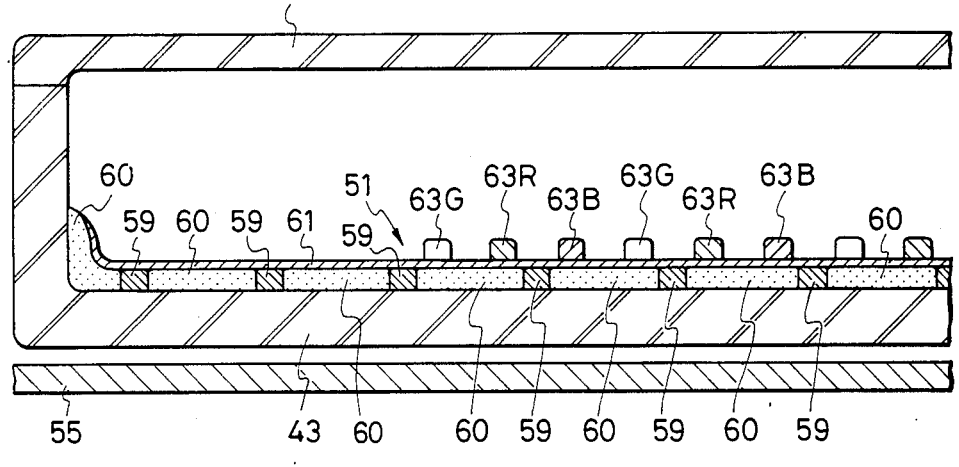
FIG. 4 is an enlarged cross-sectional view showing a part of the embodiment shown in FIGS. 1 and 2.

As shown in detail in FIG. 4, the phosphor screen 51 is formed with a plurality of index phosphor stripes 59 located on the inner surface of the screen panel portion 43 and extending parallel to one another at regularly spaced intervals. A porous inorganic layer 60 is affixed on the inner surface of the screen panel portion 43 and extends between each adjoining pair of index phosphor stripes 59. A metallic reflecting layer 61 is provided to cover the index phosphor stripes 59 and the porous inorganic layer 60. A plurality of color phosphor stripes of the three primary colors containing red phosphor stripes 63R, blue phosphor stripes 63B and green phosphor stripes 63G are provided on the metallic reflecting layer 61 in a predetermined arrangement. The red phosphor stripes 63R, the blue phosphor stripes 63B and the green phosphor stripes 63G extend parallel to one another along each of the index phosphor stripes 59 at regularly spaced intervals and each adjoining pair of the red phosphor stripes 63R, blue phosphor stripes 63B and green phosphor stripes 63G are located between two adjoining index phosphor stripes 59.

Each of the index phosphor stripes 59 is composed of a phosphor emitting fluorescent material with a peak at a range of ultraviolet rays in its spectral characteristic and having a short persistence characteristic such, for example, as $Y_2SiO_5:Ce$.

The porous inorganic layer 60 may be composed, for example, of aluminum oxide having a particle size of about the same magnitude as that of the phosphor particles of which the index phosphor stripes 59 are made and formed with a thickness substantially equal to that of the index phosphor stripes 59 so that a flat plane is formed with the surface of each of the index phosphor stripes 59 and the surface of the porous inorganic layer 60. As shown in FIG. 4, a porous inorganic layer 60 may also be provided at the outer fringe or peripheral portions of the phosphor screen 61.

The metallic reflecting layer 61 is made of aluminum and has a thickness, for example, of 500 to 1000 Å so that the electron beam from the electron gun assembly 53 penetrates the metallic reflecting layer from the side of the color phosphor stripes to the side of the index phosphor stripes 59. In the example shown in FIG. 4, a metallic reflecting layer 61 is provided also on the porous inorganic layer 60 disposed at the outer fringe portion of the phosphor screen 51.

The red, blue and green phosphor stripes 63R, 63B, and 63G located on the metallic reflecting layer 61 produce red fluorescence, blue fluorescence, and green fluorescence when impinged by an electron beam from the electron gun assembly 53.

The phosphor screen 51 of the configuration previously described can be formed in the following manner. First, a slurry including a photoresist such as a solution of polyvinyl alcohol containing ammonium dichromate and containing aluminum oxide particles of a particle size of substantially the same magnitude as those of the phosphor of which each of the index phosphor stripes is made is applied to the inner surface of the screen panel portion 43 to cover the same. The slurry on the inner surface of the screen panel portion 43 is exposed to light through a photomask which masks portions of the slurry corresponding to locations where the index phosphor stripes 59 are to be formed. The photoresist is then developed and dried to form a layer of dried aluminum oxide constituting the porous inorganic layer 60 which is fixed on the inner surface of the screen panel portion 43 with portions thereof being exposed to the light. Next, a slurry of index phosphor containing a photoresist added thereto is applied on the surface of the porous inorganic layer 60 and partial areas of the inner surface of the screen panel 43 where the porous inorganic layer 60 is not present, to cover the same. The slurry of index phosphor on the surface of the porous inorganic layer 60 and the partial areas of the inner surface of the screen panel 43 is exposed to light projected through the screen panel portion 43 with the porous inorganic layer 60 serving as a photomask from the outside of the screen panel portion 43. This photoresist is then developed and dried to form the index phosphor stripes 59 which are fixed on the partial areas of the inner surface of the screen panel portion 43.

Figure 5:
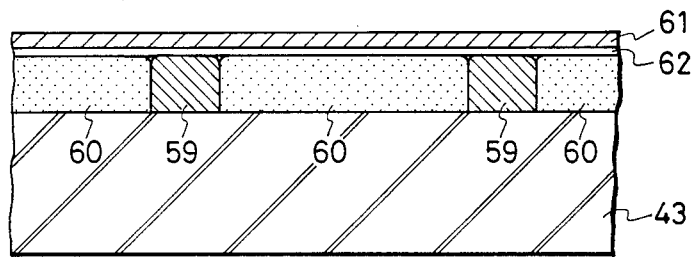
FIG. 5 is a partial cross-sectional view of a phosphor screen of the type employed in FIGS. 1 and 2 and used for explaining the process of forming the phosphor screen.

Following this, as shown in FIG. 5, the surface of the porous inorganic layer 60 and the surface of each of the index phosphor stripes 59 which together form a flat plane are covered with an intermediate thin layer 62 of an organic substance such as an acrylic resin which is provided for filling up minute recesses on both the surface of the porous inorganic layer 60 and the surface of each of the index phosphor stripes 59 to make the surfaces smooth. A metallic reflecting layer 61 having a smooth surface is formed on the intermediate thin layer 62 to cover the same, the reflecting layer being formed by means of vacuum evaporation of aluminum. Subsequently, a slurry of red phosphor containing photoresist is put on the metallic reflecting layer 61 to cover the same, and the slurry is exposed to light through a suitably configured photomask, developed, and dried to form red phosphor stripes 63R fixed to the metallic reflecting layer 61 with portions thereof being exposed to the light. Next, a slurry of blue phosphor containing photoresist is put on the metallic reflecting layer 61 to cover the same and the slurry of blue phosphor on the metallic reflecting layer is exposed to light through a suitable photomask, developed and dried to form the blue phosphor stripes 63B which are positioned between each pair of adjoining red phosphor stripes 63R on the metallic reflecting layer 61. Then, a slurry of green phosphor containing photoresist is put on the metallic reflecting layer 61 and the slurry of phosphor is exposed to light through a suitably apertured photomask. The photoresist is developed and dried to form the green phosphor stripes 63G which are located between each pair of red phosphor stripes 63R and the blue phosphor stripes 63B on the metallic reflecting layer 61 with portions thereof being exposed to the light.

After the phosphor screen 51 is formed in the manner described, the intermediate thin layer 62 of organic substance is evaporated and expelled through the index phosphor stripes 59 and the porous inorganic layer 60 to the outside of the phosphor screen 51 by means of a heating process wherein the screen panel portions 43 on which the phosphor screen 51 has been formed is subjected to a high temperature thermal treatment. The vapor resulting from the evaporation of the intermediate thin layer 62 is not prevented from escape but diffuses through the index phosphor stripes 59 and the porous inorganic layer 60 to the outside of the phosphor screen 51 and thus the metallic reflecting layer 61 is prevented from being protruded to have blisters. Since the intermediate thin layer 62 is evaporated and dispelled, the metallic reflecting layer 61 is adhered directly to both the surface of the index phosphor stripes 59 and the surface of the porous inorganic layer 60 to have a minutely rough surface corresponding to the minute recesses on the surface of each of the index phosphor stripes 59 and the surface of the porous inorganic layer 60. The metallic reflecting layer 61 having such a minutely rough surface serves to reduce reflection of light from the outside and colored light from each of the red, blue and green phosphor stripes 63R, 63B and 63G on the porous inorganic layer 60 disposed at the outer fringe portion of the phosphor screen 51. Consequently, the harmful influence exerted upon color images by the reflection of light from the outside and colored light from each of the red, blue and green phosphor stripes 63R, 63B and 63G is effectively diminished.

In the embodiment of the present invention thus far described, when the phosphor screen 51 is scanned by the electron beam from the electron gun assembly 53 the index phosphor stripe 59 on which the electron beam impinges through the metallic reflecting layer 61 is excited by the electron beam to emit the index fluorescence. A portion of the index fluorescence emitted toward the screen panel portion 43 passes directly through the screen panel portion 43 to enter into the luminescence receiving plate member 55 and another portion of the index fluorescence emitted toward the metallic reflecting layer 61 is reflected at that layer and then passes through the screen panel portion 43 to enter into the luminescence receiving plate member 55. Accordingly, the index fluorescence emitted from each of the index phosphor stripes 59 is received efficiently in the luminescence receiving plate member 55 and therefore a secondary index fluorescence sufficient in intensity is produced in response to the index fluorescence from each of the index phosphor stripes 59 in the luminescence receiving plate member 55 and directed to the photosensitive device contained in the index fluorescence detector 57.

There is accordingly produced an index signal with a superior signal-to-noise ratio in response to the secondary index fluorescence from the index fluorescence detector 57. Momentary scanning positions of the electron beam on the phosphor screen with relation to each of the red, blue and green phosphor stripes 63R, 63B and 63G are detected on the strength of the index signal, and the electron beam is subjected to modulation with the color video signals supplied to the electron gun assembly in response to the detected momentary scanning positions to impinge on each of the red, blue and green phosphor stripes 63R, 63B and 63G.

A portion of each of the red, blue and green fluorescences emitted through the front panel portion 41 passes directly through the front panel portion 41 to reach the outside of the flat glass envelope 49, and another portion of each of the red, blue and green fluorescences emitted toward the metallic reflecting layer 61 is reflected at the metallic reflecting layer 61 and then passes through the front panel portion 41 to reach the outside of the flat glass envelope 49. The red, blue and green fluorescences reach the outside of the flat glass envelope 49 so that the color images displayed on the phosphor screen 51 are observed through the front panel portion 41. As that occurs, the portion of each of the red, blue and green fluorescences emitted toward the metallic reflecting layer 61 also contribute to display the color images on the phosphor screen 51 in addition to the portion of each of the red, blue and green fluorescences emitted toward the front panel portion 41. This results in a improvement in the luminous efficiency of each of the red, blue and green phosphor stripes 63R, 63B and 63G.

As the index fluorescence emitted from each of the index phosphor stripes 59 is directed to the front panel portion 51 after passing through the metallic reflecting layer 61 and thereby weakened, each of the fluorescences reaching the outside of the flat glass envelope 49 to be observed is prevented from being deteriorated in color purity due to the index fluorescence.

Since the index fluorescence emitted from each of the index phosphor stripes 59 is directed efficiently to the luminescence receiving plate member 55 as mentioned above, the electron beam for exciting each of the index phosphor stripes 59 can be decreased in density. In that case, since a dark electron beam current in the cathode ray tube is reduced the black level of the color image on the phosphor screen 51 is prevented from rising so the color image on the phosphor screen 51 is improved in quality.

Figure 6:
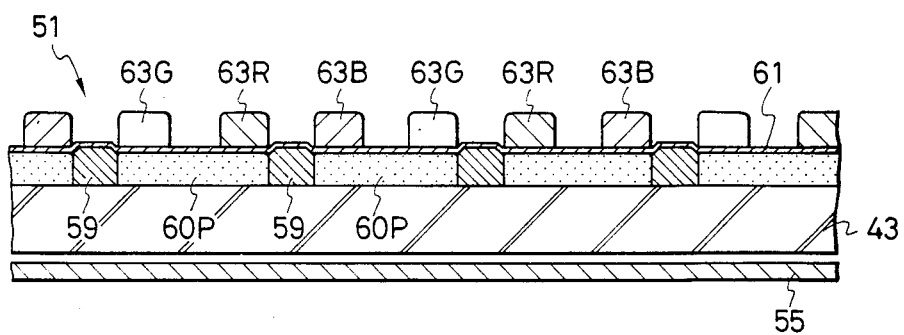
FIG. 6 is a cross-sectional view showing a part of another embodiment of a beam-index type color cathode ray tube according to the present invention.

FIG. 6 shows another embodiment of the beam-index type color cathode ray tube of the present invention. In FIG. 6, elements and portions corresponding to those of FIG. 4 are provided with the same reference numerals and therefore further description of those elements will be omitted.

In this embodiment, a porous inorganic layer 60P is provided in the phosphor screen 51 to correspond substantially to the porous inorganic layer 60 shown in FIG. 4. The inorganic layer 60P contains a pigment dispersed therein so as to provide a predetermined color. The porous inorganic layer 60P is made, for example, of aluminum oxide of a particle size of the same order of magnitude as that of the phosphor particles which comprise the index phosphor stripes 59 and a black inorganic pigment is dispersed in the aluminum oxide. The thickness is substantially equal to that of each of the index phosphor stripes 59 so that a flat plane is formed with the surface of the index phosphor stripes 59 and the surface of the porous inorganic layer 60P. The black inorganic pigment may, for example, consist of titanium monoxide (TiO).

The phosphor screen 51 having the porous inorganic layer 60P containing the black inorganic pigment dispersed therein is formed in the following manner. First, a slurry containing a photoresist such as an aqueous solution of polyvinyl alcohol containing ammonium dichromate is mixed with aluminum oxide of a particle size of substantially the same magnitude as that of the phosphor of which the index phosphor stripes 59 are made. A black inorganic pigment in an amount of about 30 to 50 weight percent is put on the inner surface of a screen panel portion 43 to cover the same. The slurry on the inner surface of the screen panel portion 43 is exposed to light through a photomask which masks portions of the slurry corresponding to locations where the index phosphor stripes 59 are to be formed. The photoresist is then developed and dried to form the porous inorganic layer 60P which is fixed on the inner surface of the screen panel portion 43 with portions thereof being exposed to the light. The porous inorganic layer 63 contains the black inorganic pigment dispersed therein and therefore exhibits a black color.

Figure 7:
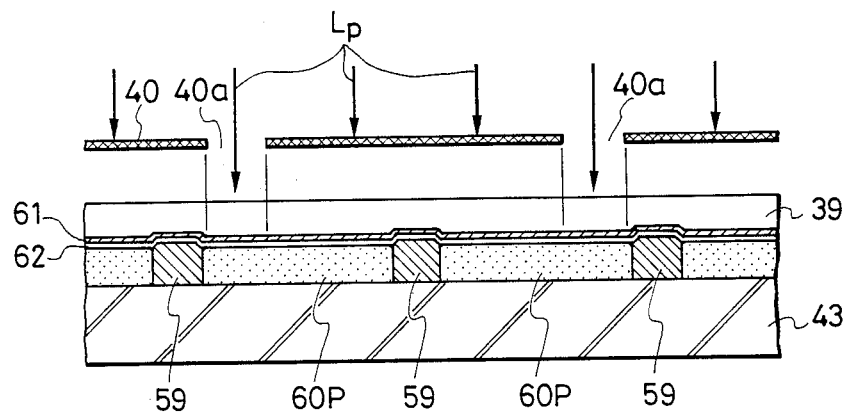
FIGS. 7 and 9 are partial cross-sectional views used for explaining the process of forming a phosphor screen in the second embodiment of the invention, a portion of which is shown in FIG. 6.

Next, as shown in FIG. 7, the index phosphor stripes 59, an intermediate thin layer 62 of organic material, and a metallic reflecting layer 61 are formed in the same manner as described in connection with the example shown in FIG. 5.

Figure 8:
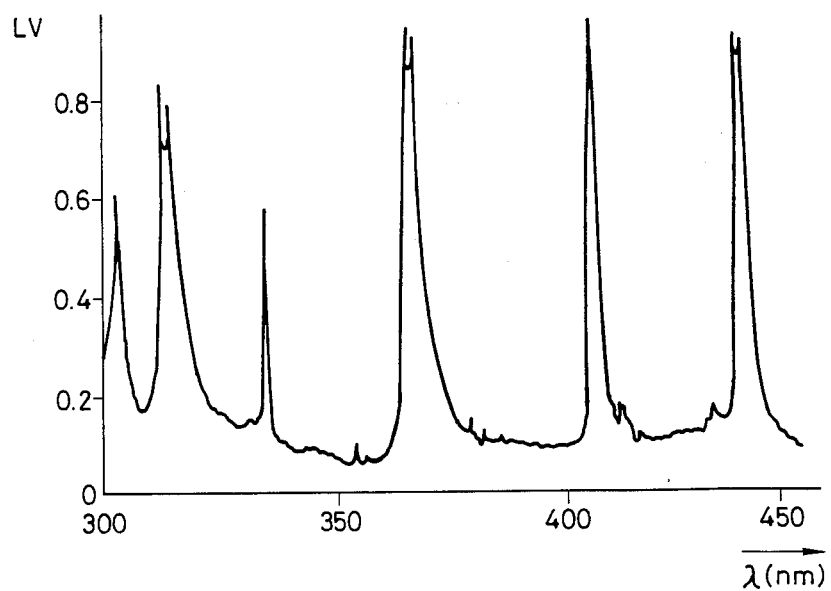
FIG. 8 is a radiation spectrum diagram of a light source used for exposure of the phosphor screen.

Red, blue and green phosphor stripes 63R, 63B and 63G are then formed on the metallic reflecting layer 61. In this process, as shown in FIG. 7, a slurry of phosphor for the green containing photoresist is put on the metallic reflecting layer 61 to form a green phosphor layer 39, which layer is exposed to light $L_p$ from a predetermined light source through a photomask 40 for green phosphor stripes. The light source for supplying the light $L_p$ comprises, for example, a mercury arc lamp having an emission spectrum characteristic in which radiation peaks of large level appear both within the ultraviolet range and the visible light range as shown in FIG. 8 where the ordinates represent the light level and the abscissae represent wavelength.

When the green phosphor layer 39 on the metallic reflecting layer 61 is exposed to the light $L_p$ passing through openings 40a of the photomask 40, the condition of exposure of the green phosphor layer 39 to the light $L_p$ is observed from the outside of the screen panel portion 43 and the position of the photomask 40 is adjusted so as to cause the light $L_p$ having passed through the openings 40a of the photomask 40 to reach locations on the green phosphor layer 39 at which the green phosphor stripes 63G are to be formed in predetermined relation to the index phosphor stripes 59. Thus, positional adjustment for locating the photomask 40 correctly for determining the positions of the green phosphor stripes 63 is carried out. In this situation, the light $L_p$ entering the index phosphor stripes 59 reaches the outside of the screen panel portion 43 with relatively small attenuation while the light $L_p$ entering in the porous inorganic layer 60P is absorbed for the most part by the black inorganic pigment dispersed in the layer 60P and therefore attenuated considerably in reaching the outside of the screen panel portion 43. Accordingly, the light $L_p$ observed at the outside of the screen panel portion 40 has a relatively large luminosity at locations corresponding to the index phosphor stripes 59 and a small luminosity at locations corresponding to the porous inorganic layer 60P.

In this way, it is possible to check whether the light $L_p$ having passed through the opening 40a of the photomask 40 enters in the locations corresponding to the index phosphor stripes 59 or in locations corresponding to the porous inorganic layer 60P by observing the condition of exposure of the green phosphor layer 39 from the outside of the screen panel 43 to detect the luminosity of the light $L_p$. Further, as apparent from FIG. 6, the position of the green phosphor stripe 63G should be adjacent to the position of the index phosphor stripe 59 without overlapping. Accordingly, the photomask 40 should be located so as not to cause the light $L_p$ having passed through the opening 40a of the photomask 40 to enter in locations on the green phosphor layer 39 corresponding to the index phosphor stripes 59. In other words, the photomask 40 should be located so as to cause the light $L_p$ observed at the outside of the screen panel portion 43 to have minimum luminosity all over the phosphor screen 51.

Figure 9:
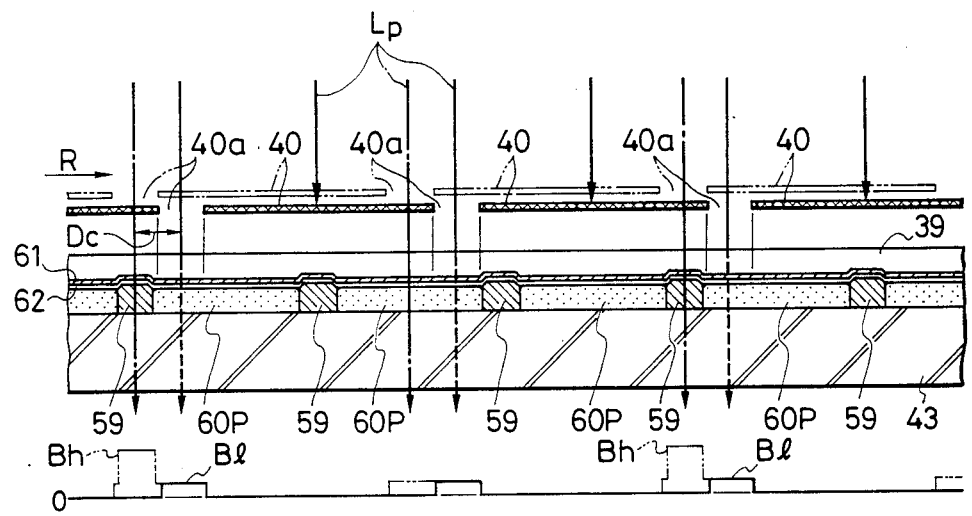

The positional adjustment of the photomask 40 for locating the same so as to cause the light $L_p$ observed at the outside of the screen panel portion 43 to have minimum luminosity over the entire phosphor screen 51 is carried out, for example, as shown in FIG. 9.

First, the photomask 40 is located at a position indicated by the dot-dash line in FIG. 9. Under these conditions, some of the openings 40a of the photomask are placed at positions corresponding to the index phosphor stripes 59 so that the light having passed through the openings 40a of the photomask placed at the positions corresponding to the index phosphor stripes 59 enters in the index phosphor stripes 59 and reaches the outside of the screen panel portion 43 with relatively large luminosity as represented by a level Bh in FIG. 9. Thus, the light $L_p$ observed at the outside of the screen panel portion 43 has maximum luminosity all over the phosphor screen 51.

Next, the photomask 40 is shifted in the direction indicated by the arrow R in FIG. 9. With this shift, the luminosity of the light $L_p$ observed at the outside of the screen panel portion 43 is reduced gradually. Then, the photomask 40 is located at a position indicated with the solid line in FIG. 9 so that the luminosity of the light $L_p$ observed at the outside of the screen panel portion 43 becomes a minimum all over the phosphor screen 51. Under these conditions, each of the openings 40a of the photomask 40 is placed at a position adjacent to the position of the index phosphor stripe 59 without overlapping so as to cause the light $L_p$ having passed through the openings 40a of the photomask 40 to enter in location on the green phosphor layer 39 where the stripes 63G are to be formed. The light $L_p$ entering in the locations on the green phosphor layer 39 at which the green phosphor stripes 63G are to be formed reaches the outside of the screen panel portion 43 with a small luminosity as represented by a level Bl in FIG. 9.

Since the distance Dc between the center of the index phosphor stripe 59 and the center of the green phosphor stripe 63G adjacent to the index phosphor stripe 59 is a predetermined constant, the distance between the center of each of the openings 40a of the photomask 40 placed at the positions corresponding to the index phosphor stripes 59 and the center of each of the openings 40a at the positions corresponding to the locations on the green phosphor layer 39 at which the green phosphor stripes 63G are to be formed is also equal to the distance Dc. Accordingly, it is possible to locate properly the photomask 40 so as to place the openings 40a at the positions corresponding to the locations on the green phosphor layer 39 at which the green phosphor stripes 63G are to be formed as shown by the solid line in FIG. 9, by means of shifting the photomask 40 which is located such that some of the openings 40a are placed at the positions corresponding to the index phosphor stripes 59, indicated by the dot-dash line in FIG. 9, by a distance corresponding to Dc in the direction of the arrow R shown in FIG. 9.

After the photomask 40 is correctly located through the positional adjustment thereof as mentioned above, the green phosphor layer 39 is exposed to the light $L_p$ passing through the openings 40a for a predetermined period, then developed and dried to form the green phosphor stripes 63G which are fixed on the metallic reflecting layer 61, with portions exposed to the light.

In succession, the slurry for the red containing photoresist is placed on the metallic reflecting layer 61 to form a red phosphor layer and the red phosphor layer on the metallic reflecting layer 61 is exposed to the light $L_p$ through a photomask for red phosphor stripes. At this time, the positional adjustment of the photomask for red phosphor stripes is carried out in the same manner as the positional adjustment of the photomask 40 for green phosphor stripes. Then the red phosphor layer is exposed to light $L_p$ passing through the photomask for red phosphor stripes for a predetermined period, developed and dried to form the red phosphor stripes 63R, which are located between each pair of adjoining green phosphor stripes 63G on the metallic reflecting layer 61.

The slurry of the blue phosphor is then put on the metallic reflecting layer 61 to form a blue phosphor layer which is exposed to light $L_p$ through a photomask for blue phosphor stripes. The positional adjustment of the photomask for blue phosphor stripes is also carried out as in the same manner described for the green phosphor stripes. Then, the blue phosphor layer is exposed to light $L_p$ passing through the photomask for blue phosphor stripes for a predetermined period, then developed and dried to form the blue phosphor stripes 63B, which are fixed between each pair of green phosphor stripes 63G and the red phosphor stripes 63R on the metallic reflecting layer 61.

After the green, red and blue phosphor stripes are formed on the metallic reflecting layer 61 as described above, the intermediate thin layer 62 is evaporated and dispelled through the index phosphor stripes 59 and the porous inorganic layer 60P in the same manner as in the example of FIG. 4.

As apparent from the above description, in this embodiment with the porous inorganic layer 60P containing a black inorganic pigment dispersed therein, the green, red and blue phosphor stripes 63G, 63R and 63B are easily positioned properly in predetermined relation to the index phosphor stripes 59 through observation of the light $L_p$ for the exposure of each of the green, red and blue phosphor layers conducted through the screen panel portion 43. The positional adjustment of each of the respective photomasks is carried out in accordance with the result of this observation in the process of forming the color phosphor stripes on the metallic reflecting layer 61.

In the example given, the porous inorganic layer 60P is made of aluminum oxide and including a black inorganic pigment dispersed therein. Other inorganic substances can also be used for forming the porous inorganic layer 60P, and a blue pigment, a green pigment, a brown pigment, or the like, can be applied instead of the black inorganic pigment.

Figure 10:
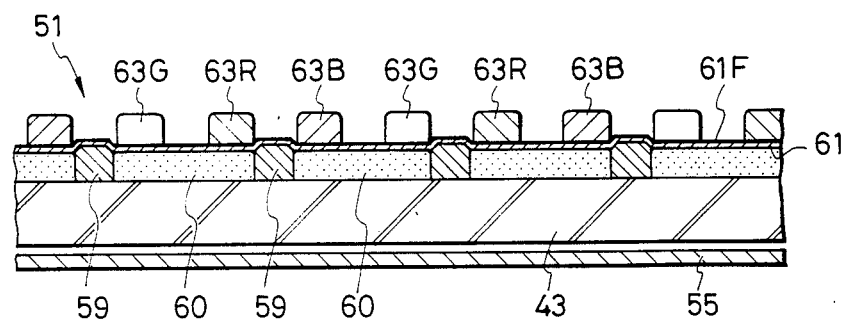
FIG. 10 is a cross-sectional view showing a portion of a further embodiment of a beam-index type color cathode ray tube according to the present invention.

FIG. 10 shows an essential part of another embodiment of the beam-index type color cathode ray tube according to the present invention. In FIG. 10, the elements and portions corresponding to those of FIG. 4 are identified with the same reference numerals and further description thereof will be omitted.

In this embodiment, a metallic reflecting layer 61 is provided to cover a plurality of index phosphor stripes 59 and a porous inorganic layer 60 on a phosphor screen 51 is provided with an oxidized surface 61F. This surface may be obtained through a process of surface treatment with an oxidizing agent. The oxidized surface 61F of the metallic reflecting layer 61 is inactivated to have reduced bonding ability to portions other than an insoluble hardened portion of the color phosphor so that unnecessary color phosphor not used for forming the color phosphor stripes can easily be eliminated from the metallic reflecting layer 61 in the process of forming the color phosphor stripes on the metallic reflecting layer 61.

The phosphor screen 51 having the metallic reflecting layer 61 and an oxidized surface 61F may be formed in the following manner.

Figure 11A:
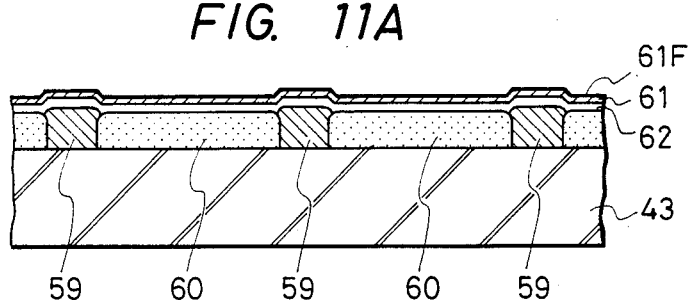
FIGS. 11A through 11D are partial cross-sectional views used for explaining the process of forming a phosphor screen in a further embodiment according to the present invention.

First, as shown in FIG. 11A, the porous inorganic layer 60 and the index phosphor stripes 59 are fixed on the inner surface of a screen panel portion 43 and the metallic reflecting layer 61 is provided with an intermediate thin layer 62 of organic substance on the porous inorganic layer 60 and the index phosphor stripes 59 in the same manner as the example shown in FIG. 5. The metallic reflecting layer 61 may be formed by means of vacuum evaporation of aluminum.

Then, the metallic reflecting layer 61 is subjected to surface treatment with an oxidizing agent and is thereby provided with an oxidized surface 61F as shown in FIG. 11A. In the surface treatment, for example, an aqueous solution including potassium permanganate in an amount of 0.0001 to 0.0002 weight percent or an aqueous solution containing ammonium dichromate of 0.001 weight percent is used as the oxidizing agent. The metallic reflecting layer 61 is dipped in the aqueous solution containing either the potassium permanganate or ammonium dichromate for about 30 seconds, washed in water, and dried.

Figure 11B:
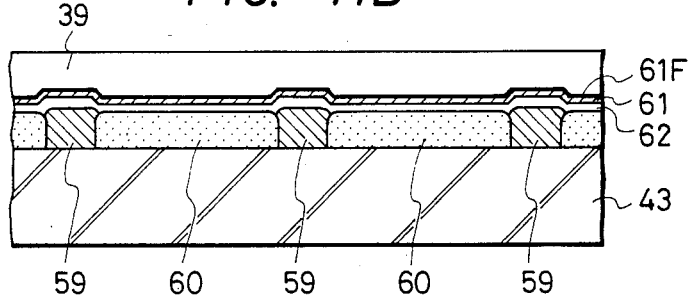
Figure 11C:
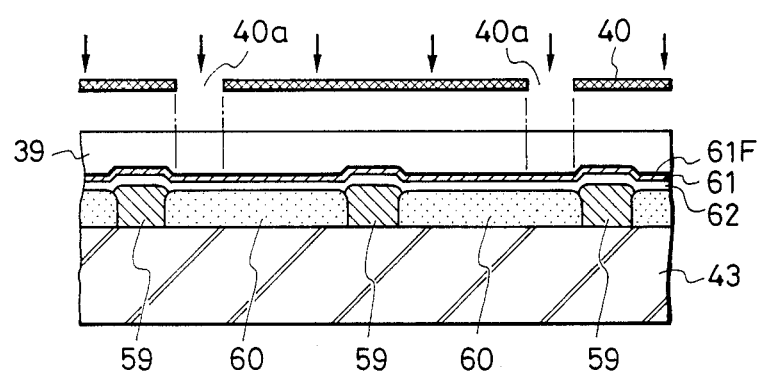
Figure 11D:
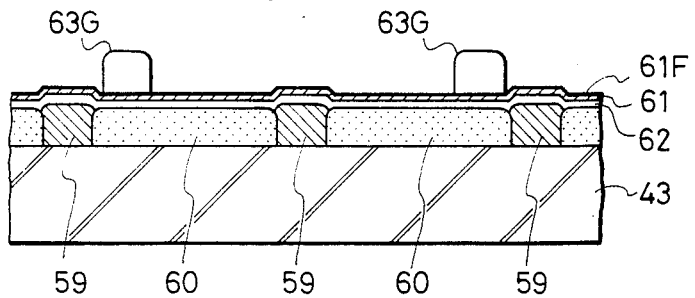

Next, as shown in FIG. 11B, for example, a slurry of green phosphor containing a photoresist is put on the oxidized surface 61F of the metallic reflecting layer 61 to form a green phosphor layer 39. This phosphor layer 39 on the oxidized surface 61F of the metallic reflecting layer 61 is exposed to light through a photomask 40 for green phosphor stripes as shown in FIG. 11C. As a result of the exposure of the green phosphor layer 39, portions of the green phosphor layer 39 corresponding to openings 40a of the photomask 40 are changed into insoluble hardened portions. The green phosphor layer 39 after exposure to light is subjected to development and portions other than the insoluble hardened portions of the green phosphor layer 39 are dissolved in water to be eliminated so that a plurality of green phosphor stripes 63G are formed and arranged in accordance with the openings 40a of the photomask 40 on the oxidized surface 61F of the metallic reflecting layer 61 with insoluble hardened portions of the green phosphor layer 39 as shown in FIG. 11D.

Since the metallic reflecting layer 61 is provided with an oxidized surface 61F which is inactivated so that it has reduced bonding ability to the portions other than the insoluble hardened portions of the green phosphor layer 39, such portions are easily eliminated sufficiently from the oxidized surface 61F of the metallic reflecting layer in the process of development utilizing normal developing time and normal developing pressure.

Then, in succession, a slurry of red phosphor is applied to the oxidized surface 61F to form a red phosphor layer, and a plurality of red phosphor stripes 63 are formed on the oxidized surface 61F in the same way as the green phosphor stripes 63G. They are disposed between adjoining two of the green phosphor stripes 63G as shown in FIG. 10. Then a slurry of phosphor for blue is put on the oxidized surface 61F of the metallic reflecting layer 61 to form a blue phosphor layer and a plurality of blue phosphor stripes 63B are formed on the oxidized surface 61F in the same way. The blue phosphor stripes are disposed between each pair of the green phosphor stripes 63G and the red phosphor stripes 63R adjoining each other, as shown in FIG. 10.

After the green, red and blue phosphor stripes are formed on the oxidized surface 61F of the metallic reflecting layer as mentioned above, the intermediate thin layer 62 is evaporated and volatilized through the index phosphor stripes 59 and the porous inorganic layer 60 in the same manner as the example of FIG. 4.

The described embodiments make use of aqueous solutions containing potassium permanganate or ammonium dichromate as oxidizing agents in the surface treatment for the metallic reflecting layer. Alternatively, an aqueous solution including periodic acid ($HIO_4$) or an aqueous solution including hydrogen peroxide ($H_2O_2$) can be used.

It should be evident that various modifications to the described embodiments can be made without departing from the scope of the novel concepts of the present invention.

We claim as our invention:

1. A beam-index type color cathode ray tube device comprising:
    a front panel portion permitting colored light to pass therethrough,
    a screen panel portion facing said front panel portion,
    a phosphor screen comprising, a plurality of index phosphor stripes fixed on an inner surface of said screen panel portion and extending at regularly spaced intervals, a porous gas permeable inorganic layer fixed on the inner surface of said screen panel portion and extending between each adjoining pair of said index phosphor stripes, a metallic reflecting layer covering said index phosphor stripes and said porous inorganic layers, a plurality of color phosphor stripes fixed on said metallic reflecting layer in a predetermined arrangement, and
    a photodetecting portion disposed at the outside of said screen panel portion for receiving fluorescence emitted from each of said index phosphor stripes.

2. A beam-index type color cathode ray tube device according to claim 1 wherein said porous inorganic layer is also provided at an outer peripheral portion of said phosphor screen.

3. A beam-index type color cathode ray tube device according to claim 1 wherein said porous inorganic layer has a thickness substantially equal to that of each of said index phosphor stripes so that a flat plane is formed by the surfaces of said index phosphor stripes and the surfaces of said porous inorganic layers.

4. A beam-index type color cathode ray tube device according to claim 1 wherein said porous inorganic layer is composed of an inorganic substance having a particle size of substantially the same magnitude as that of the phosphor of which each of the color phosphor stripes is made.

5. A beam-index type color cathode ray tube device according to claim 4 wherein said porous inorganic layer comprises aluminum oxide.

6. A beam-index type color cathode ray tube device according to claim 1 wherein said porous inorganic layer contains a pigment dispersed therein so as to provide said porous inorganic layer with a predetermined color.

7. A beam-index type color cathode ray tube device according to claim 6 wherein said pigment comprises a black inorganic pigment.

8. A beam-index type color cathode ray tube device according to claim 7 wherein said black inorganic pigment comprises titanium monoxide.

9. A beam-index type color cathode ray tube device according to claim 1 wherein said porous inorganic layer comprises both aluminum oxide and titanium monoxide.

10. A beam-index type color cathode ray tube according to claim 1 wherein said metallic reflecting layer is provided with an oxidized surface on which said color phosphor stripes are fixed.

11. A beam-index type color cathode ray tube device according to claim 10 wherein said metallic reflecting layer is formed through a process of surface treatment with an oxidizing agent for producing said oxidized surface.

12. A beam-index type color cathode ray tube device according to claim 11 wherein said metallic reflecting layer is formed by means of vacuum evaporation of aluminum and said oxidizing agent is an aqueous solution including potassium permanganate, or an aqueous solution including ammonium dichromate, or an aqueous solution including periodic acid, or an aqueous solution including hydrogen peroxide.

* * * * *